Dec. 12, 1944.   W. G. GERNANDT   2,364,629
ENGINE
Filed Aug. 5, 1942   2 Sheets-Sheet 1

INVENTOR
Waldo G. Gernandt.
BY
Gray & Smith
ATTORNEYS.

Dec. 12, 1944.     W. G. GERNANDT     2,364,629
ENGINE
Filed Aug. 5, 1942     2 Sheets-Sheet 2
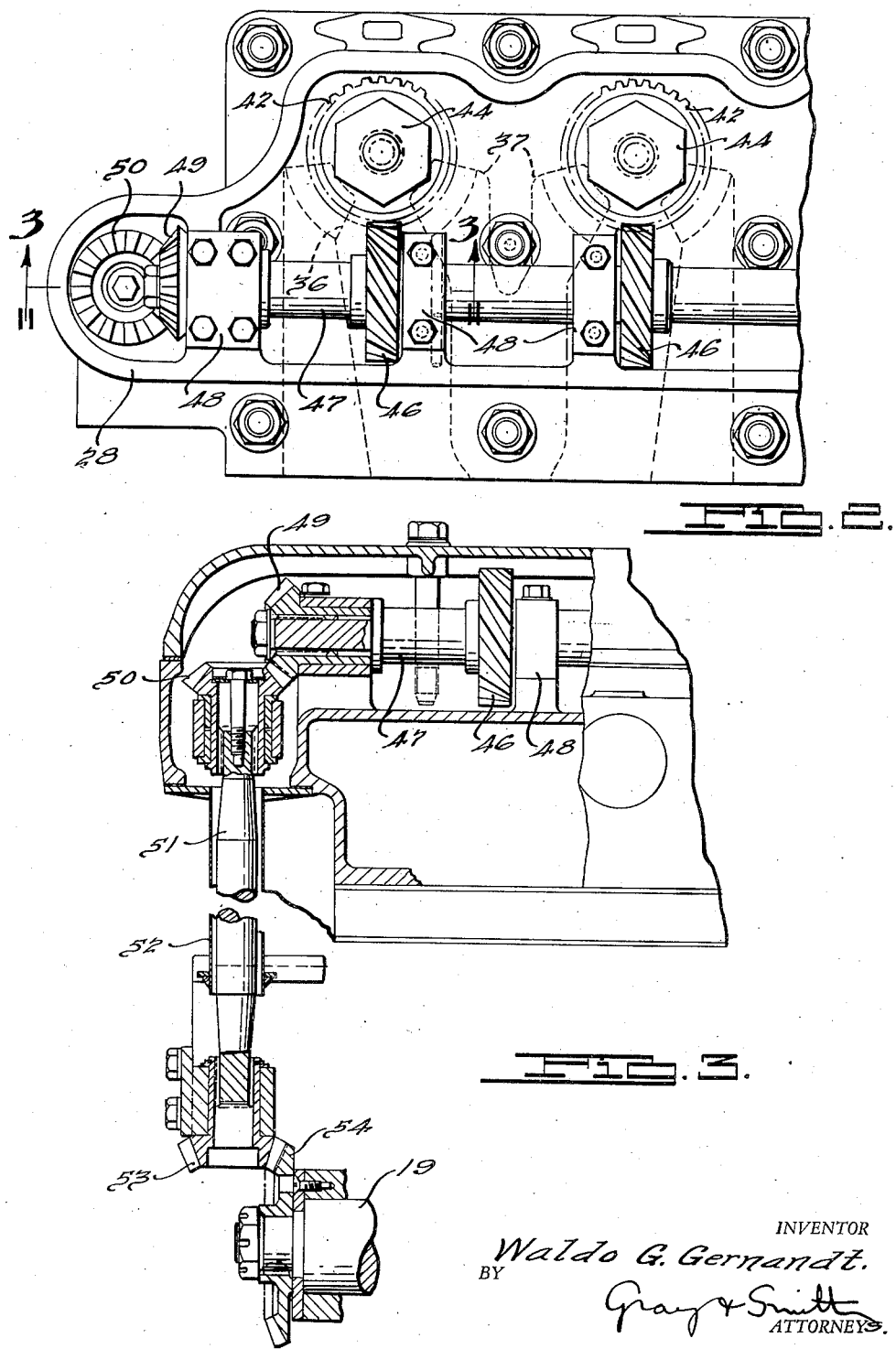
INVENTOR
Waldo G. Gernandt.
BY
Gray & Smith
ATTORNEYS.

Patented Dec. 12, 1944

2,364,629

UNITED STATES PATENT OFFICE 2,364,629

ENGINE

Waldo G. Gernandt, Detroit, Mich., assignor to Briggs Manufacturing Company, Detroit, Mich., a corporation of Michigan Application August 5, 1942, Serial No. 453,683

22 Claims. (Cl. 123—80)

This invention relates to internal combustion engines and particularly to an engine of the type having a rotatable valve in the cylinder head chambered to form a substantial portion of the combustion space. In the present embodiment of the invention the valve is of the conical or frusto-conical type and rotates within a similarly shaped cavity or bearing within the head. The valve is preferably, although not necessarily, of the type which rotates continuously in one direction, and since the valve contains a large portion, and preferably nearly all, of the combustion space when the piston is in its position of maximum compression, the valve is subjected to high temperatures during the power stroke of the piston.

Adequate and uniform dissipation of heat from the valve in order to avoid overheating and hot spots and to maintain the valve at efficient operating temperatures has presented serious problems. Heretofore, the valve has been cored to provide an integral double wall construction so as to form a cooling chamber or jacket surrounding the combustion chamber. This cooling chamber in preferred practice has been filled, or nearly so, with metallic sodium which will melt under combustion chamber temperatures and provide a satisfactory heat conducting medium. Difficulties have been encountered, however, in connection with this practice. On account of the expansion of the sodium within the cooling chamber not all of the chamber could with safety be initially filled. Consequently, during operation a portion of the valve, which required cooling, contained or was adjacent a dead air space. Thus, uniform cooling was impossible and adequate dissipation of heat was not obtained.

The foregoing disadvantages have been overcome by virtue of the present invention, an object of which being to provide a construction by which all or any desired portion of the cooling chamber or jacket of the valve may be filled with sodium or other heat dissipating medium and at the same time providing adequate space for expansion without danger of blow-outs or leakage of the sodium from the valve.

A further object of the invention is to provide an internal combustion engine having a rotatable valve provided with a combustion chamber surrounded, or nearly so, by a cooling chamber and in which means is provided whereby the chamber may be extended beyond the valve to provide an expansion space.

Another object is to provide an engine of the foregoing type in which the expansion chamber for the valve cooling jacket is in the form of a hollow member extending through the valve driving mechanism.

Still another object of the invention is to provide an engine of the foregoing kind in which the cooling jacket of the valve has an extension which projects beyond the valve into position to be cooled by air at a locality relatively remote from the valve and its combustion chamber.

Other objects of this invention will appear in the following description and appended claims, reference being had to the accompanying drawings forming a part of this specification wherein like reference characters designate corresponding parts in the several views.

This application is a continuation-in-part of my applications Serial No. 433,316, filed March 4, 1942, and Serial No. 441,474, filed May 2, 1942.

Fig. 2 is a fragmentary plan view, partly broken away, of the engine.

Fig. 3 is a section taken substantially through lines 3—3 of Fig. 2 looking in the direction of the arrows.

Figure 1:
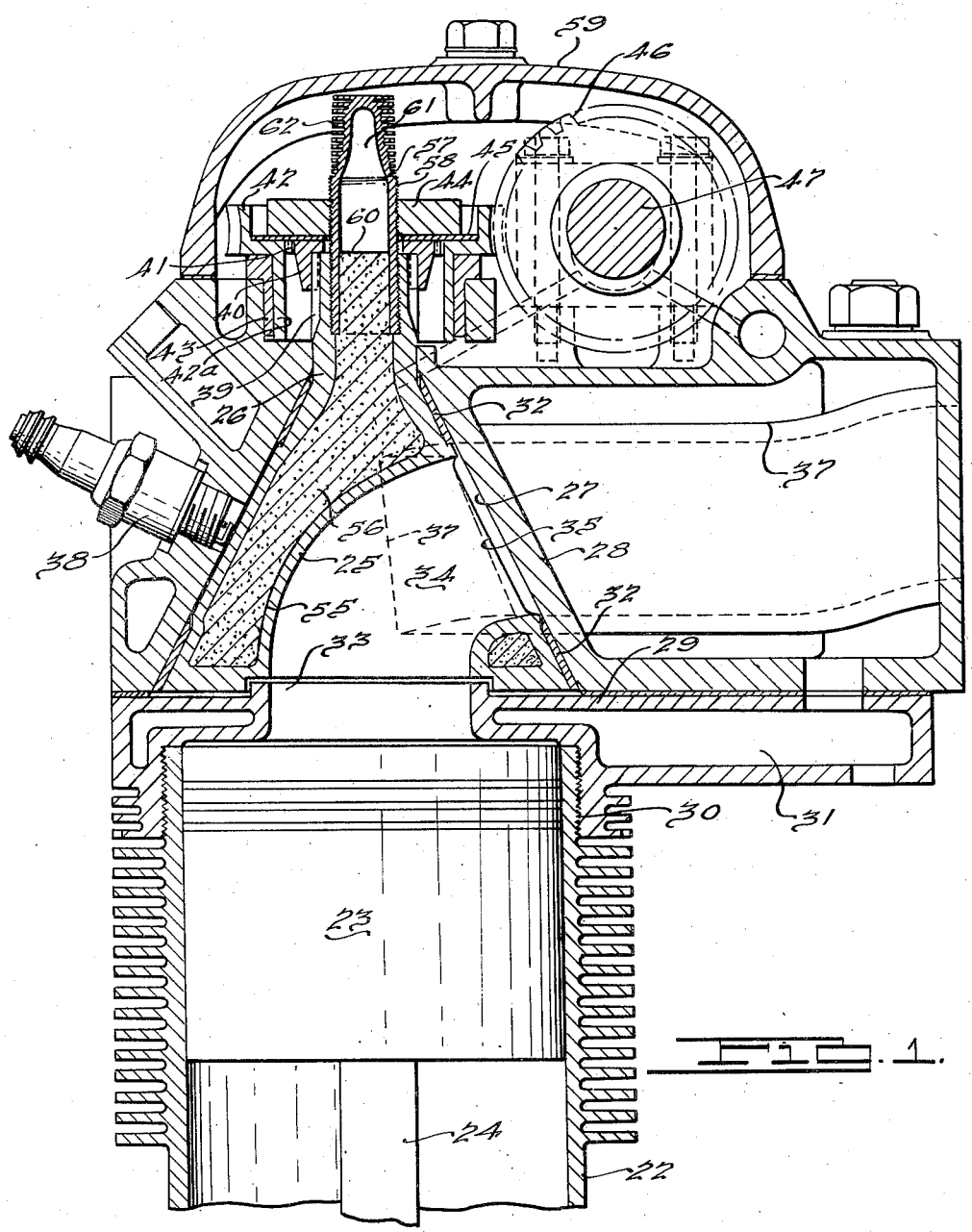
Fig. 1 is a fragmentary sectional elevation illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to an internal combustion engine of the spark ignition type designed particularly for the power plant of an aircraft. The invention may obviously be embodied in engines for other purposes, such as automotive, marine and industrial engines, and any number of cylinder units may be employed in any given engine.

Referring to Fig. 1, the present engine comprises a plurality of cylinder units 22 extending from a suitable crankcase, not shown. Mounted to reciprocate within each cylinder is a piston 23 adapted to be connected in the usual manner by a connecting rod 24 to a crankshaft 19.

In the present engine the combustion chamber of the cylinder is formed principally within a rotor or rotary member 25, this member comprising a frusto-conical body arranged immediately above the piston 23 when the latter is at the top of its stroke. The rotor or rotary valve has an integral projecting cylindrical stem 26. The rotor fits within a similarly shaped substantially frusto-conical cavity 27 in an upper cylinder head unit 28. In addition to the outer cylinder head member 28 there is provided an intermediate cylinder head member 29 which is in the form of a rotor mask or shield providing the throat opening from the cylinder into the combustion chamber 34. The upper or outer end of the cylinder is formed with external threads which are engaged by internal threads on the cylindrical skirt portion of the member 29 as indicated at 30. The member 29 is provided with a cooling member 31 and is bolted to the cylinder head member 28.

Interposed between the upper and lower ends of the tapered wall of the valve or rotor 25 and the similarly tapered wall of the cylinder head cavity 27 are a pair of spaced rotatable thrust bearing rings 32 formed of suitable material, such as bronze or lead bronze alloy. It will be noted that the rotor is formed with annularly extending recesses to receive the frusto-conical rings 32, these rings providing free floating bearings between the rotor and the cylinder head 28. The construction in this respect is preferably similar to that shown and described in my copending application Serial No. 441,474.

The rotor mask or shield 29 terminates centrally in a projecting annular flange which forms the throat opening 33 into the combustion chamber 34 of the rotor member or rotary valve 25. The valve has a port communicating directly with the throat opening 33 and of the same area. The valve also has a port opening 35 in a side wall thereof, located between the bearing rings 32, and adapted to register successively with an intake passage 36, a spark plug 38, and an exhaust passage 37, this construction also being substantially the same as that shown and described in my copending application Serial No. 441,474.

The rotor is driven through the medium of the stem 26 which is positively connected to a driving gear in such manner to to permit slight relative axial and radial movement between the driving gear and the rotor. The stem 26 of the rotor is provided with external longitudinal splines 39 cooperating with longitudinal splines on a coupling member 40 which in turn is in mesh by means of splines or gear teeth 41 with a driving gear 42. This gear has a cylindrical hub portion 42a adapted to rotate within a fixed bearing bushing 43 secured within a recess in the cylinder head. The parts are held in position by means of a clamping nut 44 which engages a resilient or yieldable washer 45 interposed between the nut and the gear 42.

The driving gear 42 for each rotor 25 meshes with a gear 46 secured to a longitudinal shaft 47 rotatable within suitable bearings 48 carried by the cylinder head. It will be understood that each cylinder of the engine is provided with a rotor or rotary valve 25 and each valve is driven by a gear 42 meshing with a gear 46 on the shaft 47, this shaft being common to all of the cylinders of the engine. Attached to one end of the shaft 7 is a gear 49 meshing with a gear 50 secured to the upper end of a tower shaft 51. This shaft is revoluble within suitable bearings and extends through a housing 52. A gear 53 is secured to the lower end of the tower shaft and meshes with a gear 54 attached to the crankshaft 19.

The valve or rotor 25 is cored to provide a cooling chamber or cavity 55 which preferably extends entirely around the combustion chamber 34. This cooling chamber is separated from the combustion chamber and the wall 27 of the bearing cavity in the cylinder head by relatively thin walls, and except for the opening through the upper end of the stem 26 the cooling chamber is entirely enclosed within the rotor body. A suitable cooling or heat conducting medium is placed within the cavity 55 and in the present instance this heat conducting or dissipating medium is in the form of metallic sodium. The stem 26 is provided with an internally threaded counterbore adjacent its outer end and fitting within this counterbore and attached to the threads thereof is a hollow tubular plug member 57 which forms an expansion chamber for the cooling medium within the valve cavity 55. The member 57 has exterior threads 58 cooperating with the internal threads of the stem 26. It will be seen that the clamping nut 44 has internal threads cooperating with the external threads of the member 57 so that the clamping nut is thus attached to the stem 26 and drawn down tightly against the spring washer 45 through the medium of the tubular member 57 which in effect forms the coupling medium between the nut 44 and the valve stem 26. The member 57 extends into the air space above the gear 42 and may be of any suitable height providing there is clearance between the member 57 and the housing or cover 59 for the valve drive mechanism.

In practice the metallic sodium 56 normally does not fill the chamber 55 and the chamber within the tubular member 57 since suitable space is preferably allowed for expansion when the sodium becomes heated during operation of the engine. The capacity of the expansion chamber within the member 57 is such, however, that the metallic sodium may extend, when the valve is cold, substantially to the line 60 or, in other words, to the top of the valve stem 26. This leaves an expansion space 61 within the member 57. If desired, this member may be provided with external cooling fins 62. The over-all diameter of the finned portion of the member 57 is somewhat less than the threaded portion 58 so as to permit removal of the clamping nut 44 and also to permit the valve to be removed through the bottom of the cylinder head cavity 27, when disassembling the parts, without necessitating removal of the tubular plug member 57.

From the foregoing it will be seen that the metallic sodium or other suitable cooling medium will extend substantially entirely around the combustion chamber 34 in intimate contact with both walls of the cavity 55 and may also extend well up into the hollow valve stem 26. The space 61 permits expansion of the cooling medium during operation and all air trapped and compressed by the sodium will be in the outer end of the tubular member 57 where the heat may more readily be dissipated therefrom. The fins 62 will assist in conducting heat from the sodium and to the trapped air within the expansion space 61.

I claim:

1. In an internal combustion engine having a cylinder, a rotatable valve having a combustion chamber communicating with said cylinder and a cooling chamber adjacent said combustion chamber, means connected to one end of said valve for driving the same, and a removable member for closing said cooling chamber and having therein a chamber extending exteriorly of said valve and communicating with said cooling chamber.

2. In an internal combustion engine having a cylinder, a rotatable valve formed with a combustion chamber communicating with said cylinder and having a cooling cavity within the walls thereof extending at least in part around said chamber, said valve having a hollow stem, a gear drivingly connected to the stem, and a hollow member extending from said stem through the gear and communicating with said cavity.

3. In an internal combusion engine having a cylinder, a rotatable valve formed with a combustion chamber communicating with said cylinder and having a cooling cavity within the walls thereof extending at least in part around said chamber, said valve having a hollow stem, a gear drivingly connected to the stem, a hollow member extending from said stem through the gear and communicating with said cavity, and means secured to said member for holding said gear in position.

4. In an internal combustion engine having a cylinder, a rotatable valve formed with a combustion chamber communicating with said cylinder and having a cooling cavity within the walls thereof extending at least in part around said chamber, said valve having a hollow stem, a gear connected to the stem to permit relative axial movement of the gear and stem, a hollow member forming an extension of said cavity and extending through the gear, and means connected to said member for yieldingly holding said gear in position.

5. In an internal combustion engine having a cylinder, a rotatable valve formed with a combustion chamber communicating with said cylinder and having a cooling cavity within the walls thereof extending at least in part around said chamber, said valve having a hollow stem, a gear connected to the stem to permit relative axial movement of the gear and stem, a hollow member forming an extension of said cavity and extending through the gear, means for detachably connecting said member to the stem, and means connected to said member for yieldingly holding said gear in position.

6. In an internal combustion engine having a cylinder, a rotatable valve formed with a combustion chamber communicating with said cylinder and having a cooling cavity within the walls thereof extending at least in part around said chamber, said valve having a hollow stem, a gear drivingly connected to the stem, and a hollow member detachably connected to said stem and extending from said stem through the gear and communicating with said cavity.

7. In an internal combustion engine having a cylinder, a rotatable generally frusto-conical valve formed with a combustion chamber communicating with said cylinder and having a cooling cavity within the walls thereof extending at least in part around said chamber, said valve having a hollow stem, a gear drivingly connected to the stem, and a hollow member extending from said stem through the gear and communicating with said cavity.

8. In an internal combustion engine having a cylinder, a rotatable valve having a combustion space and formed with a cooling chamber within the walls thereof embracing said space, said valve having a hollow stem, gear means connected to the stem for rotating the valve, and an extension of said stem projecting through said gear means and forming a continuation of said cooling chamber.

9. In an internal combustion engine having a cylinder, a rotatable generally frusto-conical valve having a combustion space and formed with a cooling chamber within the walls thereof embracing said space, said valve having a hollow stem, gear means connected to the stem for rotating the valve, and an extension of said stem projecting through said gear means and forming a continuation of said cooling chamber.

10. In an internal combustion engine having a cylinder, a rotatable valve having a combustion space and formed with a cooling chamber within the walls thereof embracing said space, said valve having a hollow stem, gear means connected to the stem for rotating the valve, and an extension of said stem detachably connected thereto and projecting through said gear means and forming a continuation of said cooling chamber.

11. In an internal combustion engine having a cylinder, a rotatable valve having a combustion space and formed with a cooling chamber within the walls thereof embracing said space, said valve having a hollow stem, gear means connected to the stem for rotating the valve, an extension of said stem projecting through said gear means and forming an continuation of said cooling chamber, and a clamping element detachably connected to said extension and coacting with said gear means.

12. In an internal combustion engine, a rotatable valve having tapering side walls converging in one direction and having an axially projecting hollow stem connected thereto, said valve having a combustion space therein and also a cooling cavity within the walls thereof embracing said chamber, said cavity extending through said stem, and a hollow plug member closing said cavity and detachably connected to the stem, said plug member forming a continuation of the cavity beyond the end of the stem.

13. In an internal combustion engine, a rotatable valve having tapering side walls converging in one direction to provide a relatively narrow portion, said valve having a combustion space therein and also a cooling cavity within the walls thereof embracing said chamber, and a hollow plug member closing said cavity and detachably connected to the valve, said plug member forming a continuation of the cavity beyond the end of said narrow portion and having walls positioned for heat exchange relatively remote from the valve combustion space.

14. In an internal combustion engine having a cylinder, a rotatable valve having a combustion space and formed with a cooling chamber within the walls thereof embracing said space, gear means connected to the valve for rotating the same, and an extension of said valve projecting through said gear means and forming a continuation of said cooling chamber, said extension having a finned portion positioned for heat exchange relatively remote from the valve combustion space.

15. In an internal combustion engine having a cylinder, a rotatable valve having a combustion space and formed with a cooling chamber within the walls thereof embracing said space, said valve having a hollow stem, means embracing said stem for holding the valve in operative position, and an extension of said stem projecting through said means and forming a continuation of said cooling chamber, said extension having an outside diameter not exceeding that of the stem to permit said means to be withdrawn from the stem and its extension axially of the valve.

16. In an internal combustion engine, a rotatable valve having tapering side walls converging in one direction and having an axially projecting hollow stem connected thereto, said valve having a combustion space therein and also a cooling cavity within the walls thereof embracing said chamber, said cavity extending through said stem, a hollow extension of said stem forming a continuation of the cavity beyond the end of the stem, and driving means for the valve embracing the stem, said extension having an outside diameter not exceeding that of the stem to permit installation or removal of the valve and said extension as a unit relative to said driving means.

17. In an internal combustion engine, a rotatable valve having tapering side walls converging in one direction and having an axially projecting hollow stem connected thereto, said valve having a combustion space therein and also a cooling cavity within the walls thereof embracing said chamber, said cavity extending through said stem, a hollow plug member closing said cavity and detachably connected to the stem, said plug member forming a continuation of the cavity beyond the end of the stem, said plug member having an outside diameter not exceeding that of the stem, and a clamping nut threadedly connected to said plug member.

18. In an internal combustion engine having a cylinder, a rotatable valve having a combustion space communicating with the cylinder and a cooling chamber adjacent said combustion space, and a removable member for closing said chamber and having therein a chamber forming a continuation of said cooling chamber.

19. In an internal combustion engine having a cylinder, a rotatable valve having a combustion space communicating with the cylinder and a cooling chamber adjacent said combustion space, and a removable member for closing said chamber and having therein a chamber forming an extension of said cooling chamber beyond the latter.

20. In an internal combustion engine having a cylinder, a rotatable valve having a combustion space communicating with the cylinder and a cooling chamber adjacent said combustion space, means for driving the valve, and a closure member detachably connected to the valve for closing said chamber and having a chamber forming an extension of said cooling chamber.

21. In an internal combustion engine having a cylinder, a rotatable valve formed with a combustion chamber communicating with said cylinder and having a cooling cavity within the walls thereof extending at least in part around said chamber, said valve having a hollow stem, and a hollow member extending from said stem having a chamber forming an extension of said cooling cavity.

22. A rotatable valve for an engine comprising a body formed with a combustion space and a cooling chamber associated therewith, a closure member detachably connected to the body for closing said chamber and having a chamber forming an extension of said cooling chamber.

WALDO G. GERNANDT